US011468150B2

(12) United States Patent
Denton et al.

(10) Patent No.: US 11,468,150 B2
(45) Date of Patent: Oct. 11, 2022

(54) COLLABORATIVE PUBLIC USER PROFILE

(71) Applicant: Snap Inc., Santa Monica, CA (US)

(72) Inventors: Trevor Denton, Santa Monica, CA (US); Swetha Krishna Prabhakar, Los Altos Hills, CA (US); Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/947,494

(22) Filed: Aug. 4, 2020

(65) Prior Publication Data

US 2020/0372127 A1  Nov. 26, 2020

Related U.S. Application Data

(63) Continuation of application No. 16/147,053, filed on Sep. 28, 2018, now Pat. No. 10,762,174.

(51) Int. Cl.
G06F 21/00 (2013.01)
G06F 21/10 (2013.01)
H04L 9/40 (2022.01)

(52) U.S. Cl.
CPC ............ G06F 21/10 (2013.01); H04L 63/08 (2013.01); H04L 63/102 (2013.01); *G06F 2221/0713* (2013.01)

(58) Field of Classification Search
None
See application file for complete search history.

(56) References Cited

U.S. PATENT DOCUMENTS

| 10,762,174 | B2 | 9/2020 | Denton et al. |
| 2009/0055742 | A1* | 2/2009 | Nordhagen ............. G06F 16/48 715/716 |
| 2011/0138175 | A1* | 6/2011 | Clark ........................ H04L 9/32 713/168 |

(Continued)

FOREIGN PATENT DOCUMENTS

| CN | 112771526 A | 5/2021 |
| KR | 20180018234 A | 2/2018 |

(Continued)

OTHER PUBLICATIONS

"U.S. Appl. No. 16/147,053, Non Final Office Action dated Mar. 26, 2020", 8 pgs.

(Continued)

*Primary Examiner* — Andrew J Steinle
(74) *Attorney, Agent, or Firm* — Schwegman Lundberg & Woessner, P.A.

(57) ABSTRACT

A system to generate a graphical user interface to display a presentation of a set of shared user groups between users of a social networking service is described. Embodiments of the present disclosure relate generally to systems for: receiving an identification of a second user from a user account of a first user; identifying a user group that includes the first user and the second user in response to the identification of the second user from the user account of the first user; retrieving user identifiers of the first user and the second user, wherein the user identifiers may include graphical avatars; generating a group identifier based on the user identifiers; and causing display of a presentation of the user group at a client device.

18 Claims, 13 Drawing Sheets

(56) References Cited

U.S. PATENT DOCUMENTS

| | | |
|---|---|---|
| 2012/0222133 A1 | 8/2012 | Kidron |
| 2012/0324002 A1* | 12/2012 | Chen .................. G06F 16/54 709/204 |
| 2014/0047035 A1 | 2/2014 | Huang et al. |
| 2014/0074976 A1 | 3/2014 | Greenberg et al. |
| 2014/0229292 A1 | 8/2014 | Reis et al. |
| 2014/0325579 A1* | 10/2014 | Schuman .......... H04N 21/2187 725/116 |
| 2016/0173622 A1 | 6/2016 | Ruben et al. |
| 2019/0180089 A1* | 6/2019 | Wang ................ G06F 3/04842 |
| 2019/0347181 A1* | 11/2019 | Cranfill ................ G06F 9/541 |
| 2020/0104466 A1 | 4/2020 | Denton et al. |

FOREIGN PATENT DOCUMENTS

| | | |
|---|---|---|
| WO | WO-2016123375 A1 | 8/2016 |
| WO | WO-2020069399 A1 | 4/2020 |

OTHER PUBLICATIONS

"U.S. Appl. No. 16/147,053, Notice of Allowance dated Apr. 29, 2020", 9 pgs.

"U.S. Appl. No. 16/147,053, Response filed Apr. 15, 2020 to Non Final Office Action dated Mar. 26, 2020", 11 pgs.

"International Application Serial No. PCT/US2019/053589, International Search Report dated Jan. 17, 2020", 3 pgs.

"International Application Serial No. PCT/US2019/053589, Written Opinion dated Jan. 17, 2020", 5 pgs.

"European Application Serial No. 19867571.2, Extended European Search Report dated Oct. 29, 2021", 7 pgs.

"International Application Serial No. PCT/US2019/053589, International Preliminary Report on Patentability dated Apr. 8, 2021", 7 pgs.

\* cited by examiner

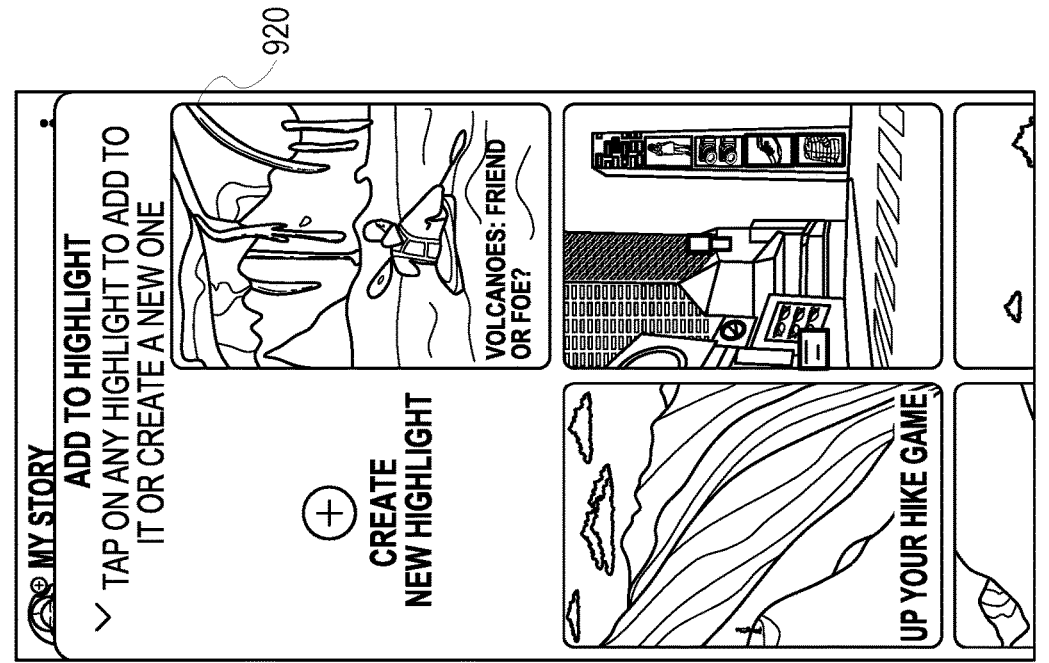
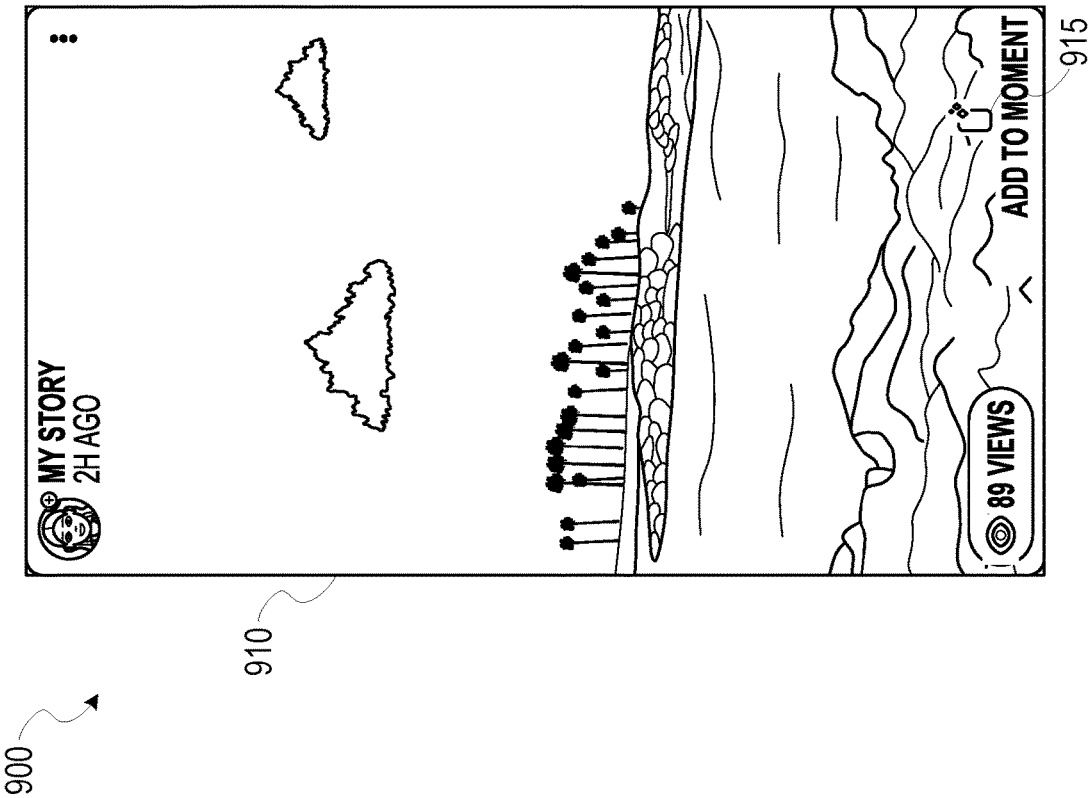
FIG. 9

1000

```
RECEIVING MEDIA CONTENT FROM A FIRST USER ACCOUNT, THE MEDIA
CONTENT COMPRISING MEDIA DATA AND A CREDENTIAL
1002
               │
               ▼
AUTHENTICATING THE MEDIA CONTENT BASED ON THE CREDENTIAL
1004
               │
               ▼
PRESENTING THE MEDIA CONTENT AMONG AN APPROVAL QUEUE
ASSOCIATED WITH A SECOND USER ACCOUNT IN RESPONSE TO THE
AUTHENTICATING THE MEDIA CONTENT BASED ON THE CREDENTIAL
1006
               │
               ▼
RECEIVING AN APPROVAL OF THE MEDIA CONTENT FROM THE SECOND
USER ACCOUNT
1008
               │
               ▼
ADDING THE MEDIA CONTENT TO A MEDIA COLLECTION ASSOCIATED
WITH THE SECOND USER ACCOUNT IN RESPONSE TO THE APPROVAL
1010
```

```
RECEIVING A REQUEST TO VIEW THE MEDIA COLLECTION ASSOCIATED
WITH THE SECOND USER ACCOUNT FROM A THIRD USER ACCOUNT
1102
```

```
PRESENTING THE MEDIA CONTENT RECEIVED FROM THE FIRST USER
ACCOUNT TO THE THIRD USER ACCOUNT IN RESPONSE TO THE REQUEST
TO VIEW THE MEDIA COLLECTION ASSOCIATED WITH THE SECOND USER
ACCOUNT
1104
```

*FIG. 11*

COLLABORATIVE PUBLIC USER PROFILE

CLAIM OF PRIORITY

This application is a continuation of U.S. patent application Ser. No. 16/147,053, filed on Sep. 28, 2018, which is incorporated herein by reference in its entirety.

TECHNICAL FIELD

Embodiments of the present disclosure relate generally to graphical user interfaces (GUI), and more particularly, to systems for generating and causing display of GUIs.

BACKGROUND

A user profile is a visual display of personal data associated with a specific user, or a customized desktop environment. A profile refers therefore to the explicit digital representation of a person or entity's identity. A profile can be used to store the description of the characteristics of a person. This information can be exploited by systems taking into account the persons' characteristics and preferences.

Although some people choose to use their real names online, some social media users prefer to be anonymous, identifying themselves by means of pseudonyms, which reveal varying amounts of personally identifiable information.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 9 is an interface diagram depicting a graphical user interface to generate collaborative content, according to certain example embodiments.

FIG. 10 is a flowchart illustrating a method for managing a collaborative user profile, according to certain example embodiments.

FIG. 11 is a flowchart illustrating a method for managing a collaborative user profile, according to certain example embodiments.

DETAILED DESCRIPTION

Figure 1:
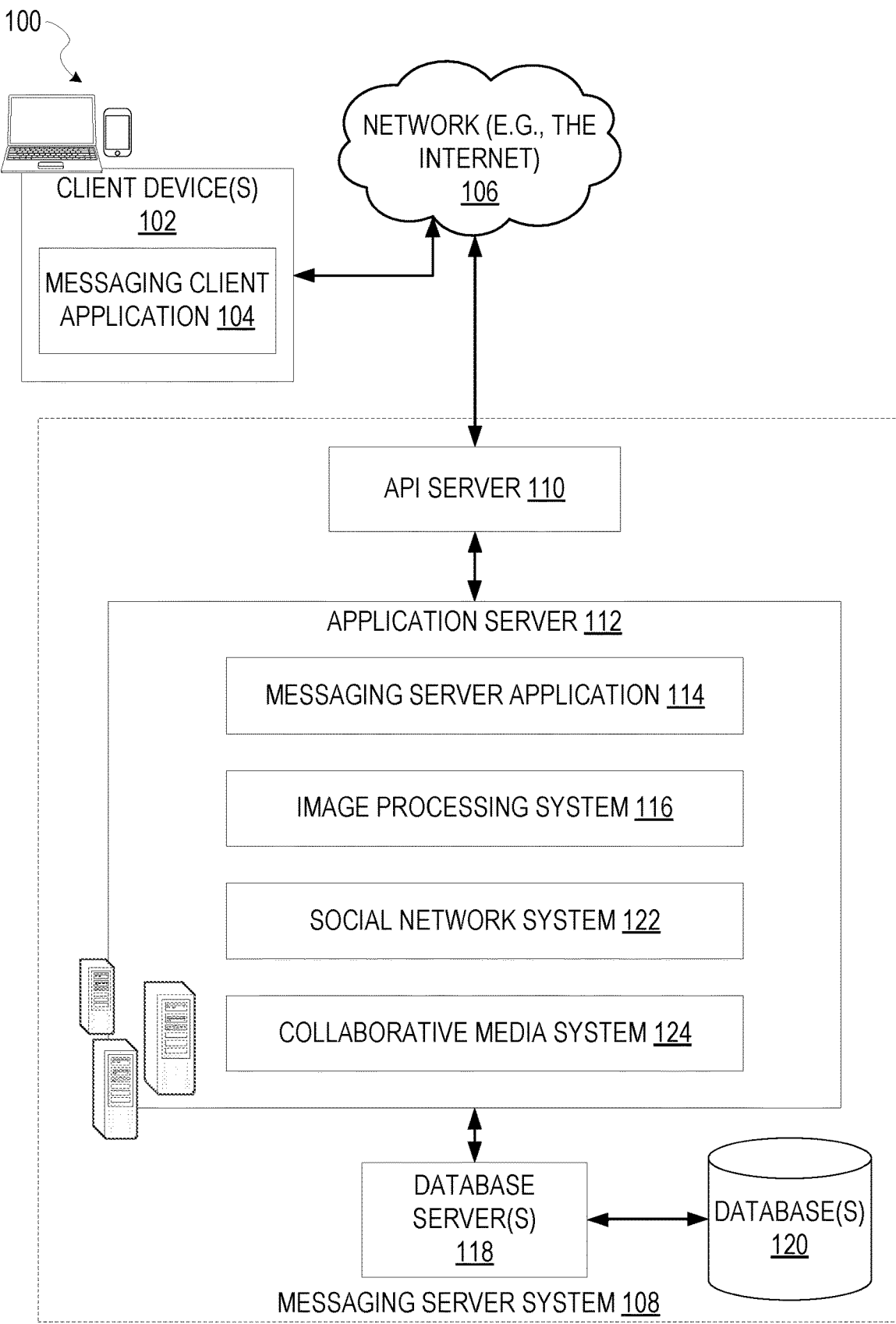
FIG. 1 is a block diagram showing an example messaging system for exchanging data (e.g., messages and associated content) over a network in accordance with some embodiments, wherein the messaging system includes a media collaboration system.

A collaborative media system to generate and maintain a collaborative user profile is described. Embodiments of the present disclosure relate generally to systems for: receiving media content from a first user account, wherein the media content includes image data, video data, and audio data, as well as an authentication credential associated with a second user account; authenticating the media content from the first user account based on the authentication credential; presenting the media content among an approval queue associated with the second user account in response to authenticating the media content based on the authentication credential; receiving an approval of the media content from the second user account; and adding the media content to a media collection associated with the second user account, in response to the approval.

Consider an illustrative example from a user perspective. A user profile is a visual display of personal data associated with a specific user. As a result of the ubiquity of social networking systems, corporate entities as well as celebrities may desire to maintain an online presence through a user profile. In order to maximize that online presence, the disclosed collaborative media system provides systems and interfaces for multiple users to collaborate on a single user profile by providing media content for approval, while the user profile ultimately remains under the control of an administrator.

According to certain example embodiments, media content may be generated by a first user account. For example, a first user account may generate the media content by providing one or more media items to the collaborative media system, or by selecting one or more media items located in a shared media repository associated with a second user profile (i.e., the collaborative user profile). The media items may for example include images, videos, audio, as well as media filters.

In response to receiving the media content at the collaborative media system, the collaborative media system authenticates the media content based on an authentication credential. For example, the first user account may provide the authentication credential to the collaborative media system. In further embodiments, the collaborative media system may retrieve the authentication credential from the first user account.

In some embodiments, the collaborative media system assigns a timestamp to the media content received from the first user account. The timestamp may for example indicate a time and date in which the media content was created by the first user account, or in which the media content was provided to the collaborative media system for inclusion in a second user account.

The media content may be added to an approval queue associated with the second user profile. In some embodiments, a position of the media content within the approval queue may be based on the timestamp. For example, a more recent timestamp may result in the media content being displayed more prominently within the approval queue—at the beginning, while a later timestamp may result in the media content being displayed towards the end of the queue. In further embodiments the timestamp itself may be presented on a display of the media content within the approval queue.

In some embodiments, in response to adding the media content to the approval queue, the collaborative media system may present a notification to the second user account indicating that there is new media content to be reviewed for approval. The collaborative media system may receive an approval or a denial of the media content. In the case of a denial, the media content may be removed from the approval queue, and a notification may be presented to the first user account that indicates the media content was denied. In the case of an approval of the media content, in response to receiving the approval, the collaborative media system adds the media content to a media collection associated with the second user account (i.e., the collaborative user profile).

In some embodiments, the approval of the media content received from the second user account may also include one or more updates to the media content. For example, by selecting the media content within the approval queue, the second user account may be presented with one or more options to modify or alter the media content. The one or more options may include options to add text, alter text, add graphical elements, modify existing graphical elements, add audio, modify existing audio, add media filters, adjust media filters, adjust colorfulness, chroma, saturation, brightness, contrast, and sharpness of the media content, or alter display attributes of the media content such as a display duration (for ephemeral content), geolocation criteria and temporal criteria to receive access to the media content.

Accordingly, a single collaborative user profile may be maintained by a plurality of users that provide media content to be reviewed by an administrative account (i.e., the second user profile). The media content can then be presented through second user profile, such that as users provide requests to view a media collection of the second user profile, the media content provided by a first user profile may be displayed in such a way that it appears to have originated from the second user profile.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a collaborative media system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
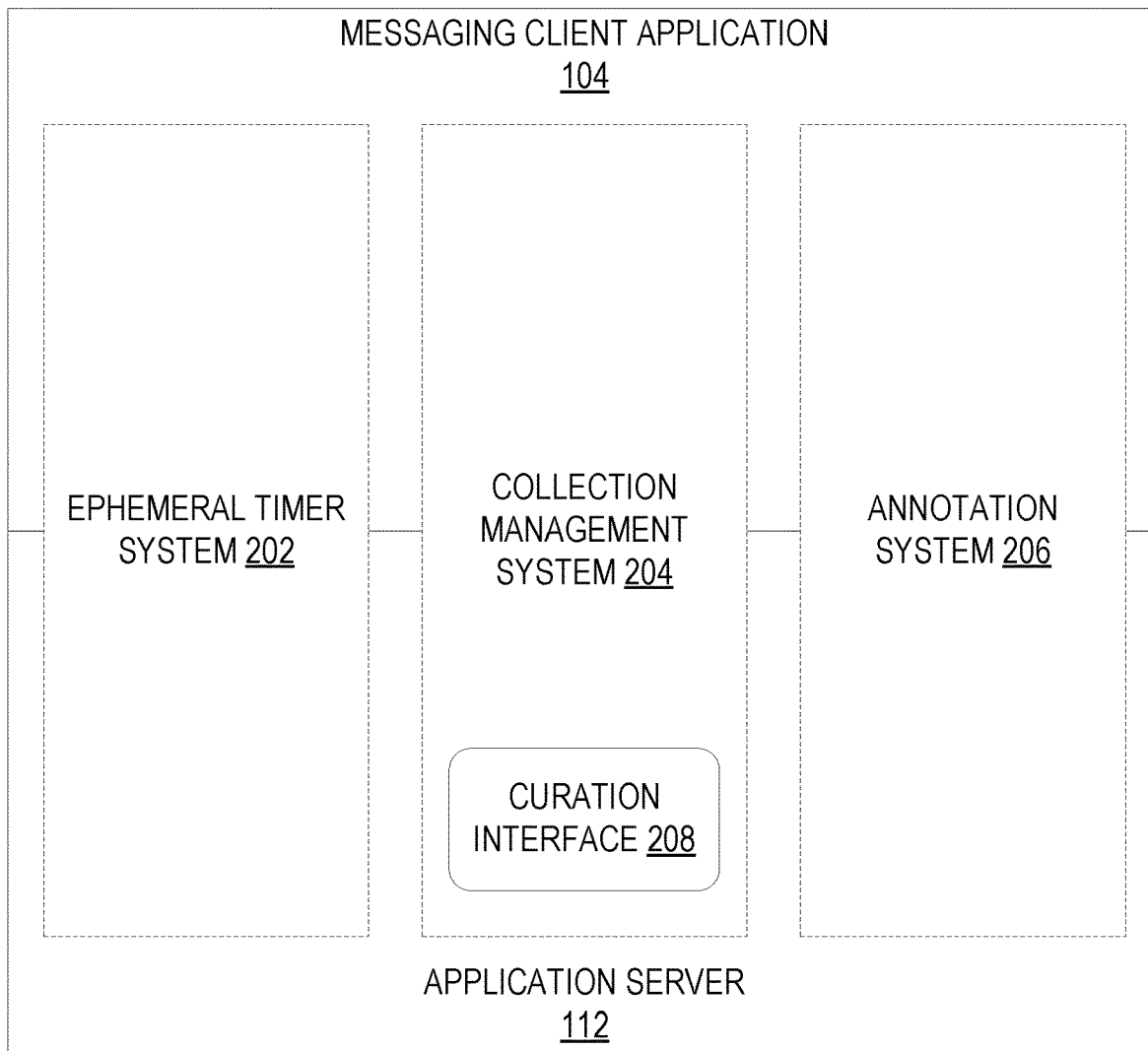
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
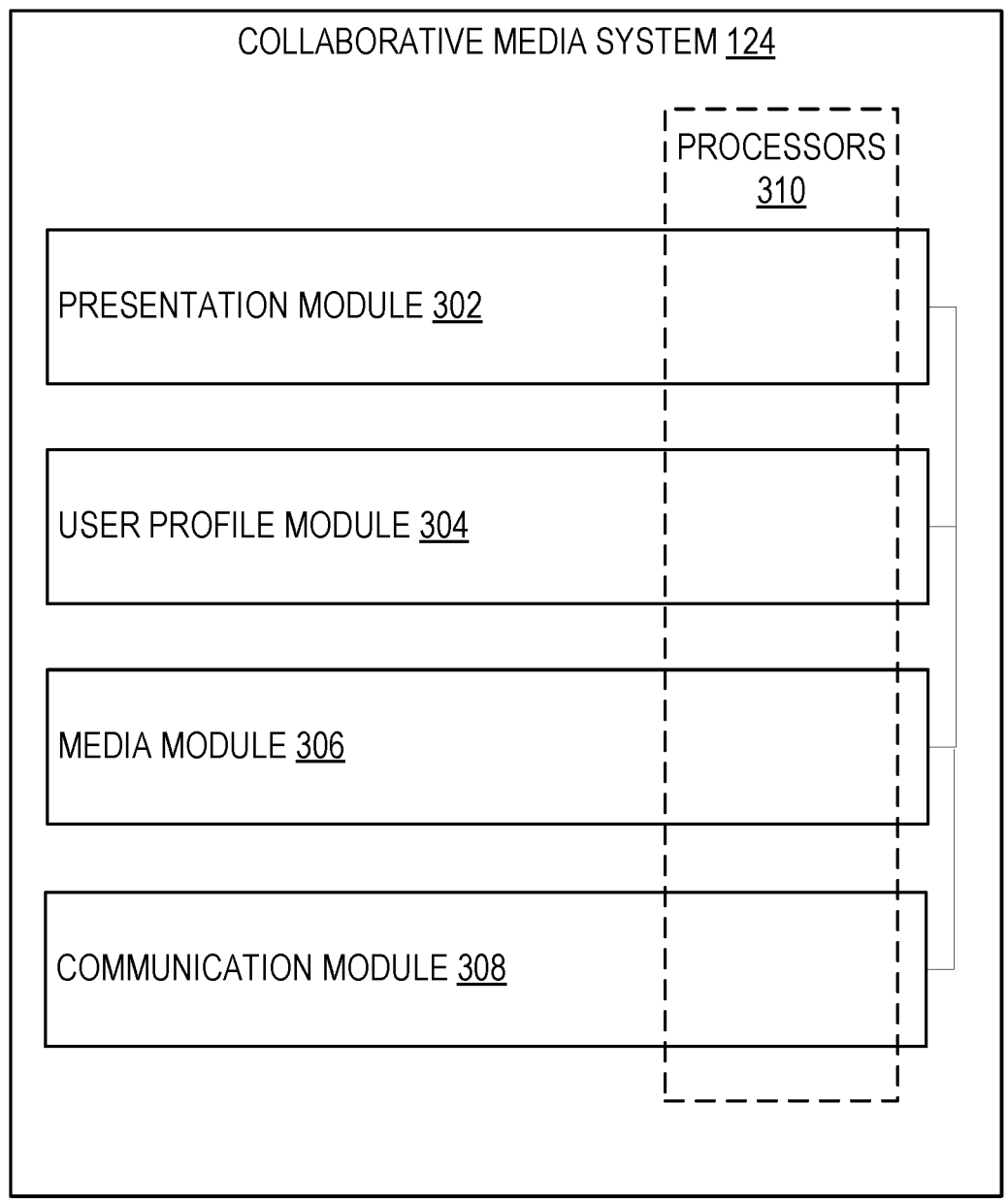
FIG. 3 is a block diagram illustrating various modules of a media collaboration system, according to certain example embodiments.

In another example embodiment, the annotation system 206 provides a merchant-based publication platform that enables merchants to select a particular media overlay associated with a geolocation. For example, the annotation system 206 associates the media overlay of a highest bidding merchant with a corresponding geolocation for a predefined amount of time FIG. 3 is a block diagram illustrating components of the collaborative media system 124 that configure the collaborative media system 124 to perform operations that include receiving media content from a first user account, wherein the media content includes image data, video data, and audio data, as well as an authentication credential associated with a second user account; authenticating the media content from the first user account based on the authentication credential; presenting the media content among an approval queue associated with the second user account in response to authenticating the media content based on the authentication credential; receiving an approval of the media content from the second user account; and adding the media content to a media collection associated with the second user account, in response to the approval, according to certain example embodiments.

The collaborative media system 124 is shown as including a presentation module 302, a user profile module 304, a media module 306, and a communication module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the collaborative media system 124 may physically include an arrangement of one or more of the processors 310 (e.g., a subset of or among the one or more processors of the machine) configured to perform the operations described herein for that module. As another example, any module of the collaborative media system 124 may include software, hardware, or both, that configure an arrangement of one or more processors 310 (e.g., among the one or more processors of the machine) to perform the operations described herein for that module. Accordingly, different modules of the collaborative media system 124 may include and configure different arrangements of such processors 310 or a single arrangement of such processors 310 at different points in time. Moreover, any two or more modules of the collaborative media system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
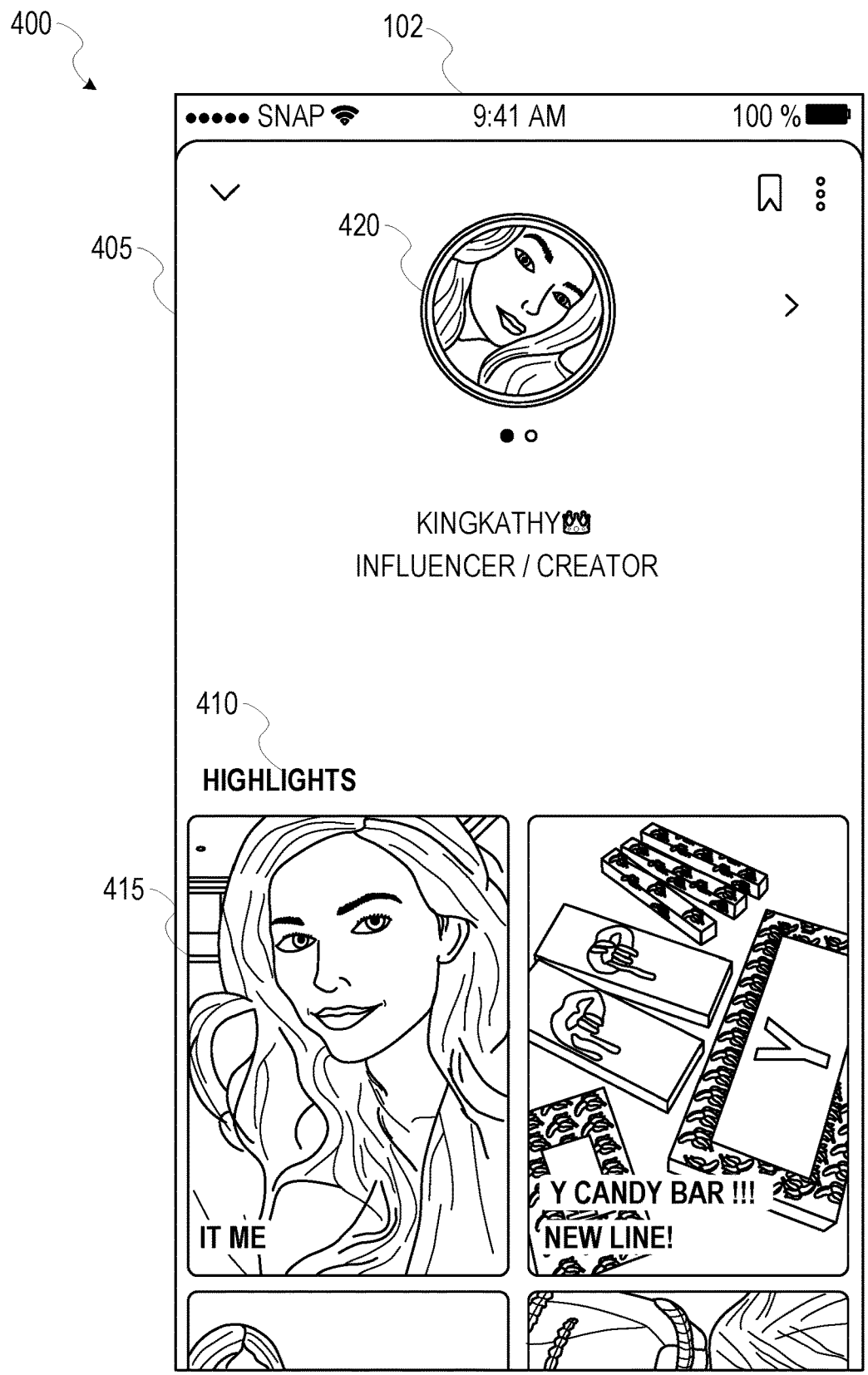
FIG. 4 is an interface diagram depicting a collaborative user profile, according to certain example embodiments.

FIG. 4 is an interface diagram 400 depicting a collaborative user profile 405 displayed at a client device 102, according to certain example embodiments. As seen in FIG. 4, the collaborative user profile 405 comprises a display of a media collection 410 that includes a set of media content such as media content 415. As discussed herein, the media content comprising the media collection 410 may be originated from a plurality of user accounts, and approved for display within the media collection 410 by an administrator of the user account 420.

The administrator of the user account 420 may additionally provide inputs to define a position of the media content 415 within the media collection 410. For example, upon review and approval of the media content 415 from an approval queue (such as the approval queue 505 depicted in FIG. 5), the administrator of the user account 420 may provide an input defining the position of the media content 415 within the media collection 410. In some embodiments, the input may include grabbing and dragging the media content 415 to the desired position among the media collection 410, while in further embodiments, the input may include an input that assigns special status to the media content 415 (for example, defining the media content 415 as a highlight). In even further embodiments, the position of the media content 415 may simply be based on when the media content 415 was approved for display within the media collection 410, with the most recent additions being displayed at a first position among the media collection 410.

Figure 5:
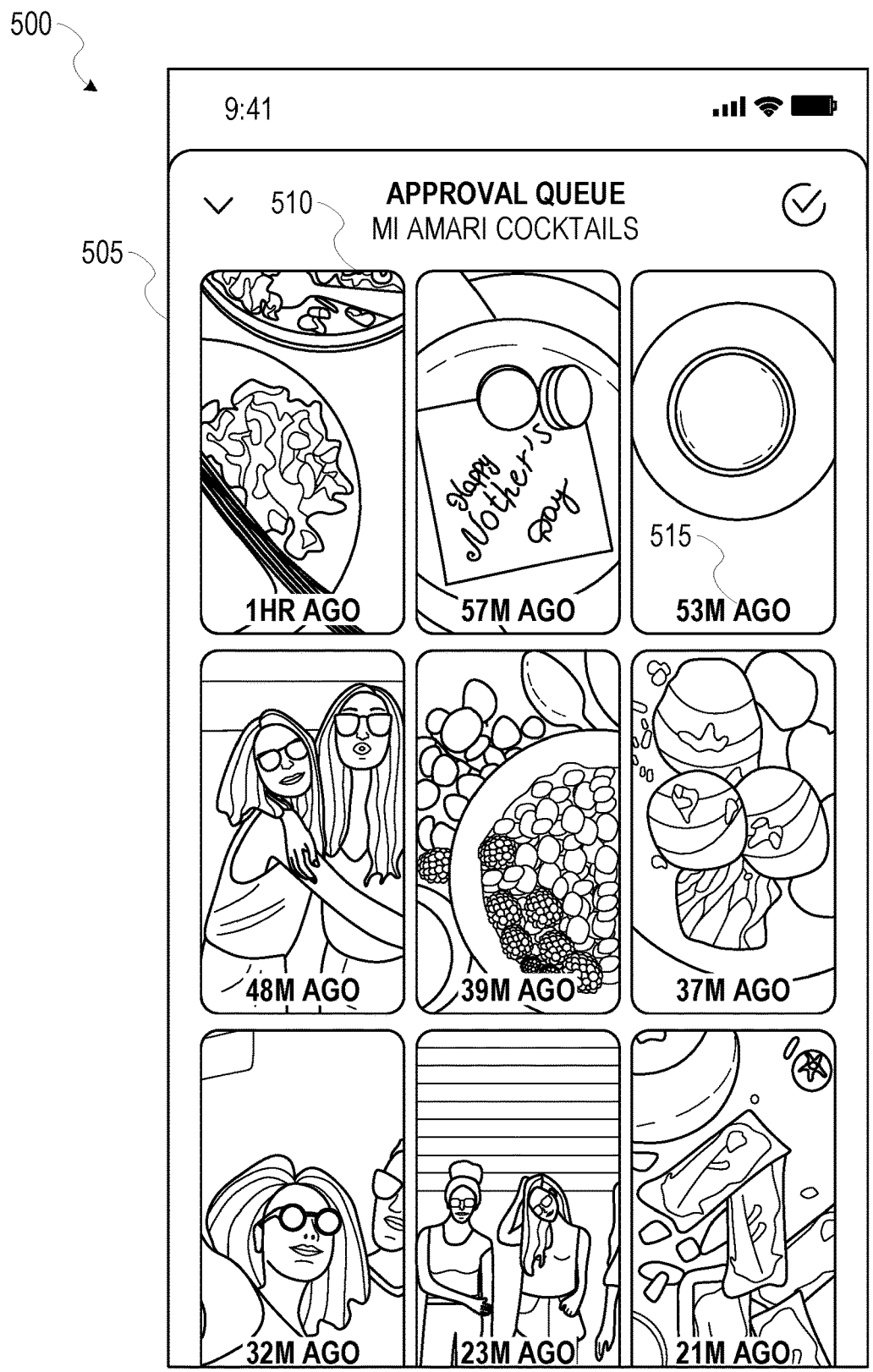
FIG. 5 is an interface diagram depicting an approval queue, according to certain example embodiments.

FIG. 5 is an interface diagram 500 depicting an approval queue 505, according to certain example embodiments. As seen in FIG. 5, the approval queue 505 comprises media content such as the media content 510. A position of the media content within the approval queue 505 may be based on a timestamp, such as the timestamp 515.

For example, the media content 510 may be generated by a first user account and submitted to the collaborative media system 124 for review by an administrator of a second user account. The administrator of the second user account may then be presented with the approval queue 505, in order to provide one or more inputs selecting media content, such as the media content 510. The selected media content may then be approved, modified, or denied.

Figure 6:
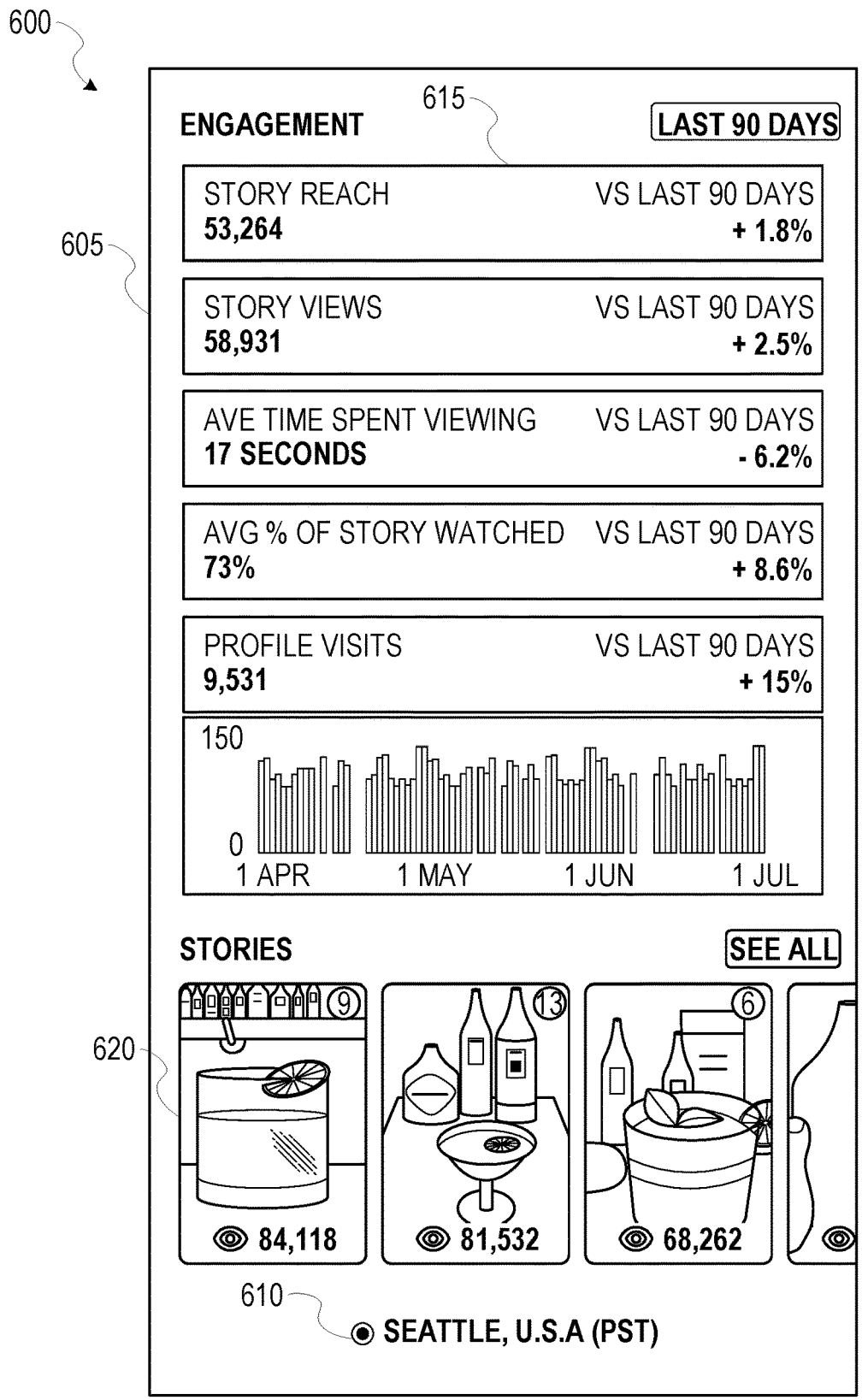
FIG. 6 is an interface diagram depicting a collaborative interface, according to certain example embodiments.

FIG. 6 is an interface diagram 600 depicting a collaborative interface 605, according to certain example embodiments. As seen in FIG. 6, the collaborative interface 605 may include an interface to display media statistics 615 of media content comprising a media collection, such as the media content 415 depicted in FIG. 4.

In some embodiments, the media statistics 615 may only be made available to an administrator of the collaborative profile, while in further embodiments the media statistics 615 may be made available to users with authentication credentials for the collaborative user profile.

In some embodiments, the collaborative interface 605 may be presented in response to receiving an input that selects media content, such as the media content 415, from an administrator of the collaborative user profile, or a user with authentication credentials for the collaborative user profile. In such embodiments, the media statistics 615 would correspond with the selected media content. For example, a qualified user may provide a tactile input that includes input attributes such as a pressure or duration, and in response to the collaborative media system 124 detecting the input attribute transgressing a threshold value (e.g., a threshold duration, a threshold pressure), the collaborative media system may generate and cause display of the collaborative interface 605.

In some embodiments, a user presented with the collaborative interface 605 may provide an input to identify a location 610 associated with the media statistics 615. By defining the location 610, the collaborative media system 124 may retrieve media statistics 615 associated with the identified media content (e.g., media content 415), based on the location 610. Thus, the media statistics 615 may provide an indication of regional statistics of the identified media content.

In some embodiments, the collaborative interface 620 may further comprise a display of media content 620, wherein the media content 620 is curated from the media collection of the identified media content (e.g., media content 415 corresponds to media collection 410). A user presented with the collaborative interface 605 may provide an input selecting media content from among the media content 620, and in response the collaborative media system 124 may cause display of corresponding media statistics 615.

Figure 7:
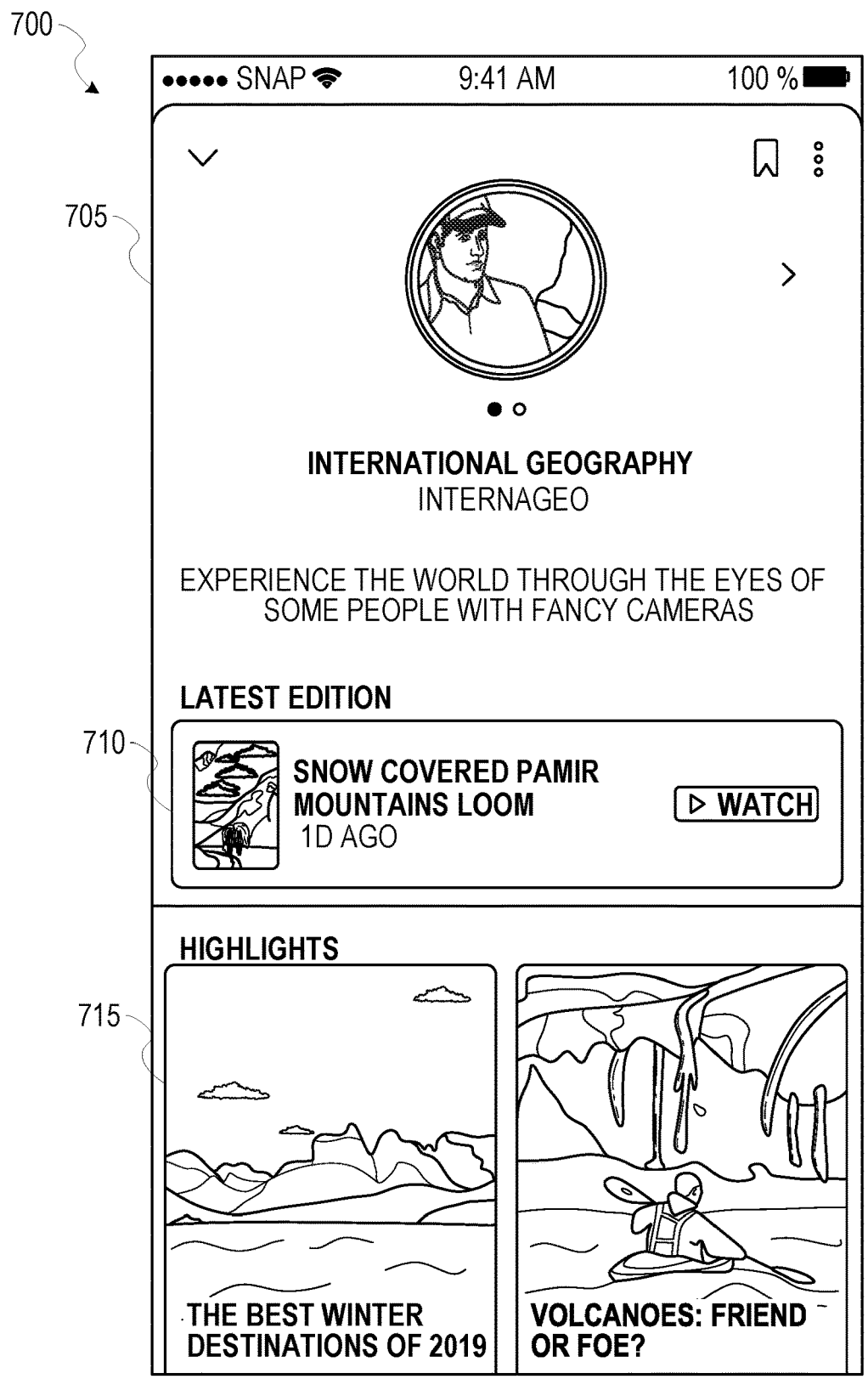
FIG. 7 is an interface diagram depicting a collaborative user profile, according to certain example embodiments.

FIG. 7 is an interface diagram 700 depicting a collaborative user profile 705, according to certain example embodiments. As seen in FIG. 7, the collaborative user profile 705 includes a display of prominent content 710 at a position within the collaborative user profile 705 that is separate from the display of the media collection 715.

In some embodiments, an administrator of the collaborative user profile 705 may provide an approval of media content from among media content displayed within the approval queue (e.g., the approval queue 505 depicted in FIG. 5), wherein the approval of the media content (e.g., the prominent content 710) includes an administration of a special status to the media content that defines presentation features for the media content. For example, the administrator may provide an input to define media content as "prominent content," and in response, the collaborative media system 124 may present the media content at a position within the collaborative user profile separate from the media collection 715 (i.e., the prominent content 710).

Figure 8:
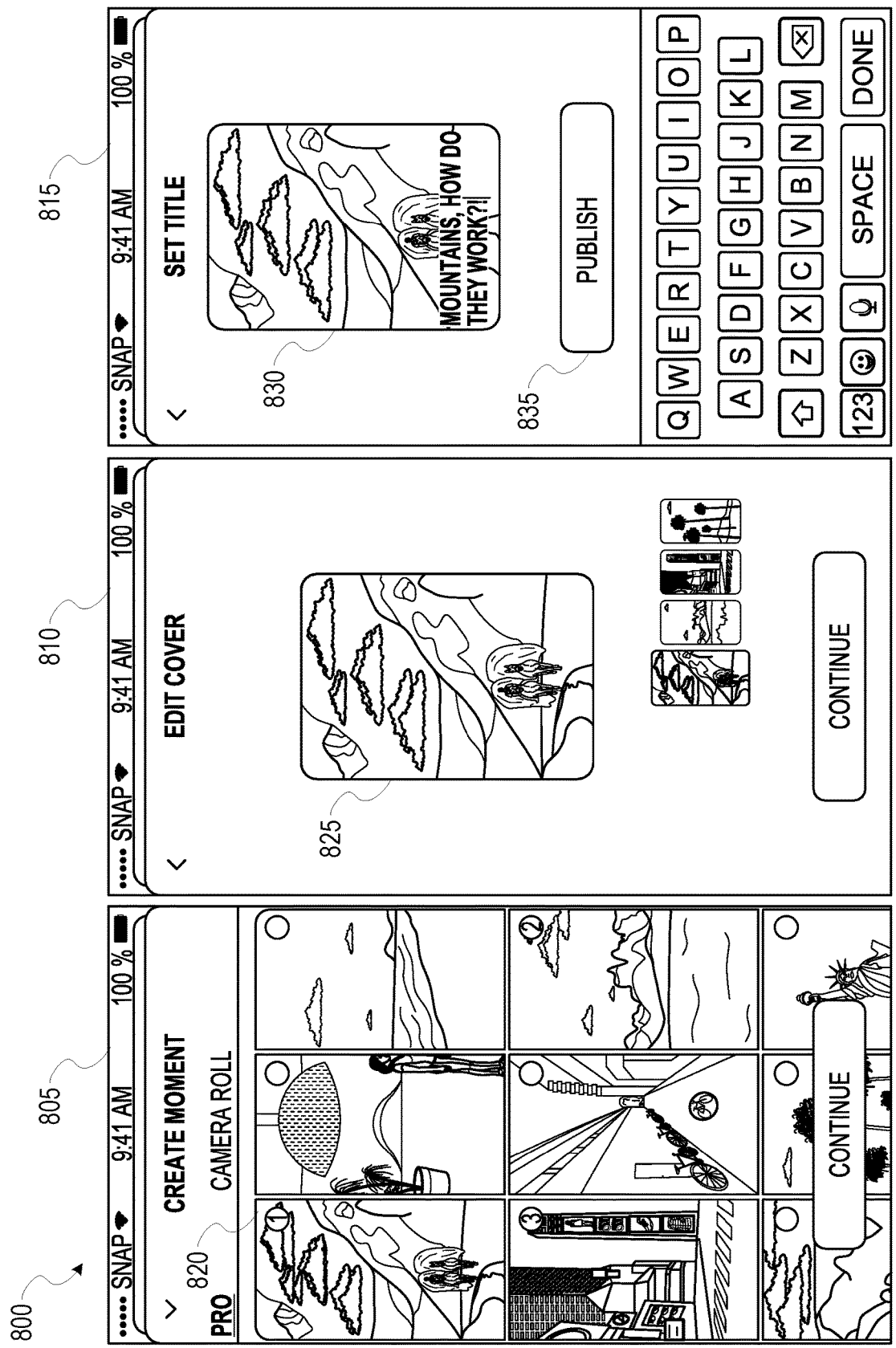
FIG. 8 is an interface diagram depicting graphical user interfaces to generate collaborative content, according to certain example embodiments.

FIG. 8 is an interface diagram 800 depicting graphical user interfaces (GUIs) 805, 810, and 815 to generate collaborative content 820, according to certain example embodiments.

As seen in FIG. 8, the GUI 805 comprises a display of a collection of media items 820. In some embodiments, the GUI 805 may be displayed at a collaborative user's client device (e.g., client device 102). The collection of media items 820 may either reside locally on the client device 102, or in some embodiments may comprise a shared media repository located within the database 120, and that may be accessible by all collaborative users (e.g., users with authentication credentials associated with the collaborative user profile).

In response to receiving a selection of a media item (e.g., the media item 825) from among the collection of media items 820, the collaborative media system 124 may cause display of the GUI 810 to generate media content (e.g., the media content 830). For example, a user may provide one or more inputs to add text or graphical elements to the media item 825.

In response to generating the media content 830, the collaborative media system 124 may cause display of the GUI 815 to display the media content 830, and to add a caption or title to the media content 830. In some embodiments, selecting the graphical icon 835 may cause the collaborative media system 124 to add the media content 830 to the approval queue 505 depicted in FIG. 5.

FIG. 9 is an interface diagram 900 depicting a graphical user interface 905 to generate collaborative content 910, according to certain example embodiments.

As seen in FIG. 9, a collaborative user may generate media content 910, and add the media content to a media collection (e.g., the media collection 920) by providing an input that selects the graphical icon 915. For example, the graphical icon 915 may be displayed on the media content 910 in response to the collaborative media system 124 determining that the collaborative user has the authentication credentials required for a collaborative user profile.

The collaborative user may select a media collection, such as the media collection 920, and in response the collaborative media system 124 may add the media content 910 to the media collection 920.

FIG. 10 is a flowchart illustrating a method 1000 for maintaining and managing a collaborative user profile, according to certain example embodiments. Operations of the method 1000 may be performed by the modules described above with respect to FIG. 3. As shown in FIG. 10, the method 1000 includes one or more operations 1002, 1004, 1006, 1008, and 1010.

At operation 1002, the media module 306 receives media content from a first user account, wherein the media content comprises media data and an authentication credential. For example, the first user account may be associated with a collaborative user account (e.g., a second use account), and the authentication credential may be associated with a collaborative user profile. The media content received by the media module 306 may include the media content 415 depicted in FIG. 4, as well as the media content 510 in the approval queue 505 of FIG. 5. In some embodiments, the collaborative user account (e.g., the second user account) may be associated with a client device. A second user/administrator of the collaborative user account may receive the media content at a client device 102.

At operation 1004, the user profile module 304 authenticates the first user account based on the authentication credential. For example, the authentication credential may be provided by the first user account to the user profile module 304, or in some embodiments, the user profile module 304 may maintain a list of authorized user profiles, which may be defined by an administrator of a collaborative profile. In some embodiments, the authentication may be performed by the client device 102 (e.g., the client device associated with the administrator of the collaborative user account). For example, the administrator may retain and save authentication criteria associated with the collaborative user account at the client device 102.

At operation 1006, in response to authenticating the first user account based on the authentication credential, the presentation module 302 presents the media content among an approval queue, such as the approval queue 505 depicted in FIG. 5. As discussed above, the approval queue may be associated with a second user profile (i.e., a collaborative user profile).

In some embodiments, the media module 306 may assign a timestamp to the media content in response to the user profile module 304 authenticating the first user account, wherein the timestamp indicates a time and date in which the media content was received by the media module 306, or in some embodiments, a time and date in which the media content was created by the first user account. The presentation module 302 may present the media content at a position within the approval queue based on the timestamp.

At operation 1008, the media module 306 receives an approval of the media content from a second user account associated with the collaborative user profile. For example, the second user account may be an administrator associated with the collaborative user profile.

In some embodiments, the approval of the media content received from the second user account may additionally include presentation instructions that define a position among a media collection to display the media content.

At operation 1010, in response to receiving the approval of the media content from the second user account, the presentation module adds the media content to a media collection associated with the second user account. A position of the media content among the media collection may be based on inputs received from the second user account.

FIG. 11 is a flowchart illustrating a method 1100 for maintaining and managing a collaborative user profile, according to certain example embodiments. Operations of the method 1100 may be performed by the modules described above with respect to FIG. 3. As shown in FIG. 11, the method 1100 includes one or more operations 1102, and 1104.

At operation 1102, the communication module 308 receives a request to view a media collection associated with a second user account from a third user account. For example, the second user account may be a collaborative user profile, and the third user account may be a public user of a social network system, or a social network connection of the second user account.

In response to receiving the request to view the media collection associated with the second user account, the presentation module 302 causes display of at least the media content received from the first user account (i.e., a collaborative user associated with the collaborative user profile) to the third user account. The display of the media content to the third user account may be presented such that it appears that the media content originated from the second user account, and that there is no indication that the media content was generated by a separate user account.

Software Architecture

Figure 12:
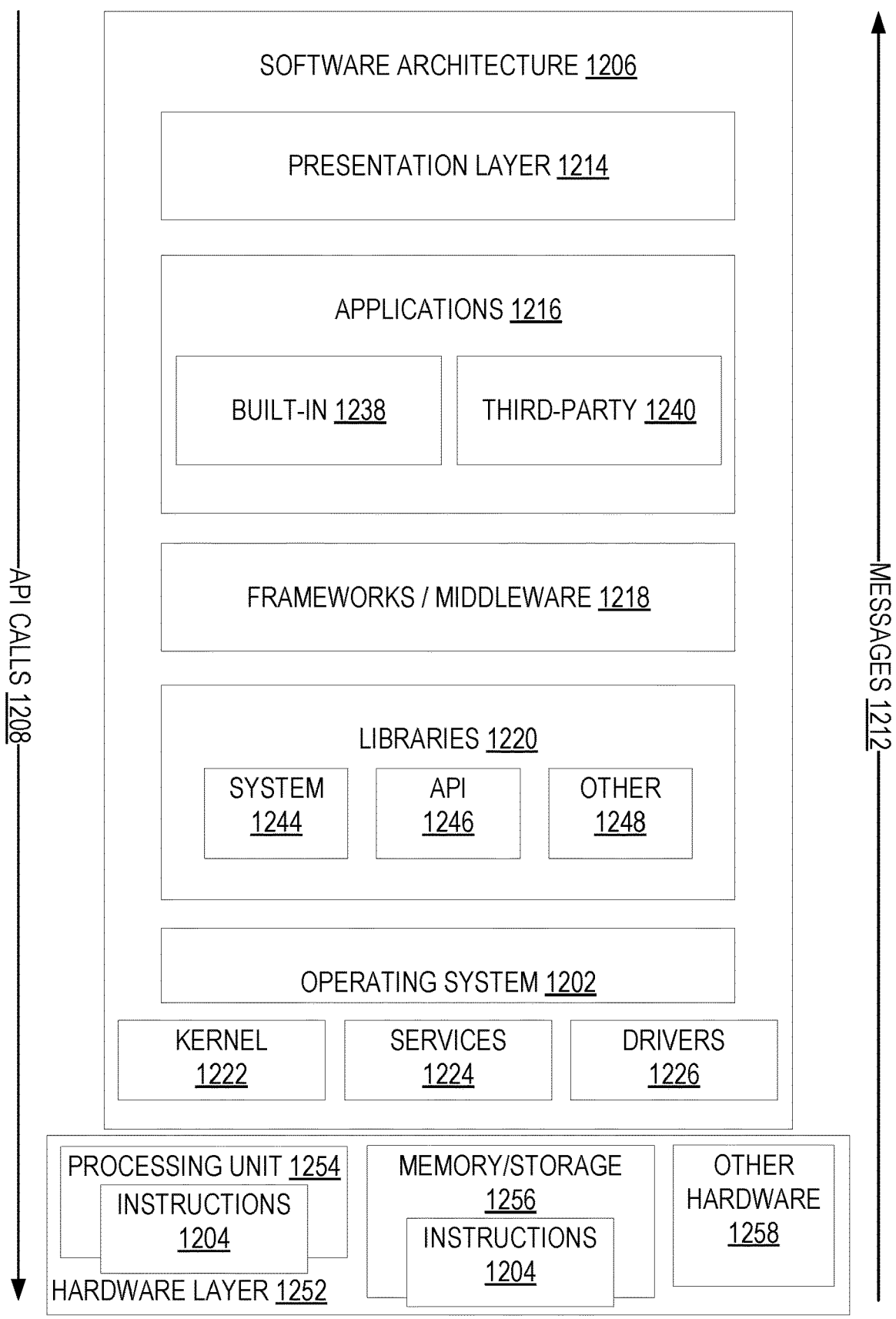
FIG. 12 is a block diagram illustrating a representative software architecture, which may be used in conjunction with various hardware architectures herein described and used to implement various embodiments.

FIG. 12 is a block diagram illustrating an example software architecture 1206, which may be used in conjunction with various hardware architectures herein described. FIG. 12 is a non-limiting example of a software architecture and it will be appreciated that many other architectures may be implemented to facilitate the functionality described herein. The software architecture 1206 may execute on hardware such as the machine 1300 of FIG. 13 that includes, among other things, processors 1304, memory 1314, and I/O components 1318. A representative hardware layer 1252 is illustrated and can represent, for example, the machine 1200 of FIG. 12. The representative hardware layer 1252 includes a processing unit 1254 having associated executable instructions 1204. Executable instructions 1204 represent the executable instructions of the software architecture 1206, including implementation of the methods, components and so forth described herein. The hardware layer 1252 also includes memory and/or storage modules memory/storage 1256, which also have executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, applications 1216 and a presentation layer 1214. Operationally, the applications 1216 and/or other components within the layers may invoke application programming interface (API) API calls 1208 through the software stack and receive a response as in response to the API calls 1208. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224 and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than to interface directly with the underlying operating system 1202 functionality (e.g., kernel 1222, services 1224 and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 (also sometimes referred to as middleware) provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. Third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as operating system 1202) to facilitate functionality described herein.

The applications 1216 may use built in operating system functions (e.g., kernel 1222, services 1224 and/or drivers 1226), libraries 1220, and frameworks/middleware 1218 to create user interfaces to interact with users of the system. Alternatively, or additionally, in some systems interactions with a user may occur through a presentation layer, such as presentation layer 1214. In these systems, the application/component "logic" can be separated from the aspects of the application/component that interact with a user.

Figure 13:
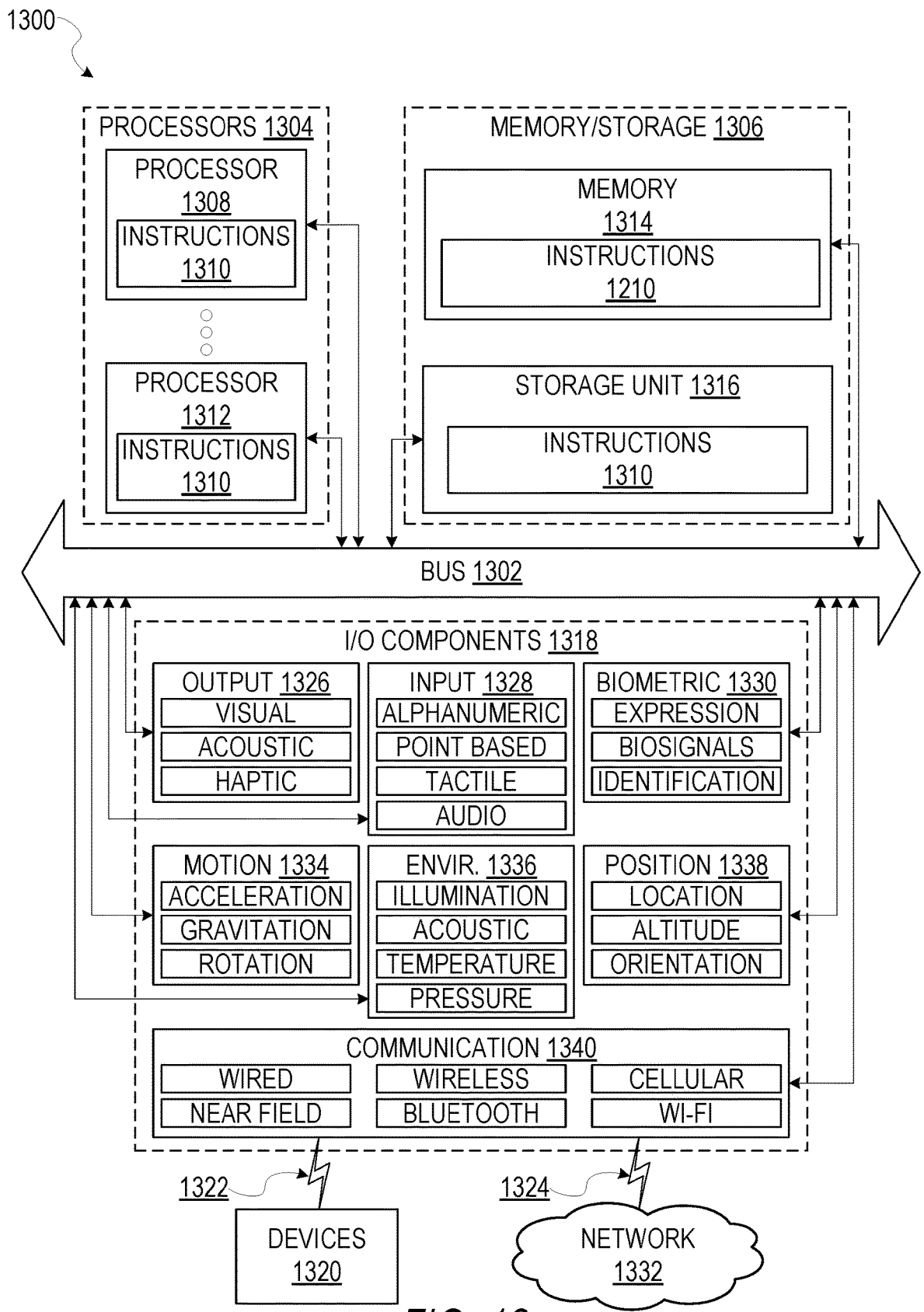
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the/O components 1318 may include biometric components 1330, motion components 1334, environmental environment components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via coupling 1322 and coupling 1324 respectively. For example, the communication components 1340 may include a network interface component or other suitable device to interface with the network 1332. In further examples, communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a Universal Serial Bus (USB)).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
    presenting a display of media content at a position among a collection of media content, the position among the collection of media content based on a timestamp associated with the media content;
    receiving an identification of a location;
    receiving an input that selects the media content, the input comprising an input attribute;
    determining a value of the input attribute transgresses a threshold value;
    determining a regional statistic associated with the media content based on the location; and
    causing display of a presentation of a statistic associated with the media content in response to the determining that the value of the input attribute transgresses the threshold value, the statistic including the regional statistic.

2. The method of claim 1, wherein the input includes a tactile input and the input attribute includes an input pressure of the tactile input.

3. The method of claim 1, wherein the input includes a tactile input and the input attribute includes an input duration of the tactile input.

4. The method of claim 1, wherein the causing display of the presentation of the statistic includes:
    accessing authentication credentials in response to the receiving the input that selects the media content; and
    causing display of a presentation of the statistics based on the authentication credentials.

5. The method of claim 1, wherein the statistic includes a number of views of the media content.

6. The method of claim 1, wherein the presentation of the statistic includes a bar graph.

7. A system comprising:
    a memory; and
    at least one hardware processor coupled to the memory and comprising instructions that causes the system to perform operations comprising:

presenting a display of media content at a position among a collection of media content, the position among the collection of media content based on a timestamp associated with the media content;
receiving an identification of a location;
receiving an input that selects the media content, the input comprising an input attribute;
determining a value of the input attribute transgresses a threshold value;
determining a regional statistic associated with the media content based on the location; and
causing display of a presentation of a statistic associated with the media content in response to the determining that the value of the input attribute transgresses the threshold value, the statistic including the regional statistic.

8. The system of claim 7, wherein the input includes a tactile input and the input attribute includes an input pressure of the tactile input.

9. The system of claim 7, wherein the input includes a tactile input and the input attribute includes an input duration of the tactile input.

10. The system of claim 7, wherein the causing display of the presentation of the statistic includes:
   accessing authentication credentials in response to the receiving the input that selects the media content; and
   causing display of a presentation of the statistics based on the authentication credentials.

11. The system of claim 7, wherein the statistic includes a number of views of the media content.

12. The system of claim 7, wherein the presentation of the statistic includes a bar graph.

13. A non-transitory machine-readable storage medium comprising instructions that, when executed by one or more processors of a machine, cause the machine to perform operations comprising:
presenting a display of media content at a position among a collection of media content, the position among the collection of media content based on a timestamp associated with the media content;
receiving an identification of a location;
receiving an input that selects the media content, the input comprising an input attribute;
determining a value of the input attribute transgresses a threshold value;
determining a regional statistic associated with the media content based on the location; and
causing display of a presentation of a statistic associated with the media content in response to the determining that the value of the input attribute transgresses the threshold value, the statistic including the regional statistic.

14. The non-transitory machine-readable storage medium of claim 13, wherein the input includes a tactile input and the input attribute includes an input pressure of the tactile input.

15. The non-transitory machine-readable storage medium of claim 13, wherein the input includes a tactile input and the input attribute includes an input duration of the tactile input.

16. The non-transitory machine-readable storage medium of claim 13, wherein the causing display of the presentation of the statistic includes:
   accessing authentication credentials in response to the receiving the input that selects the media content; and
   causing display of a presentation of the statistics based on the authentication credentials.

17. The non-transitory machine-readable storage medium of claim 13, wherein the statistic includes a number of views of the media content.

18. The non-transitory machine-readable storage medium of claim 13, wherein the presentation of the statistic includes a bar graph.

* * * * *